United States Patent
Brommer et al.

(10) Patent No.: US 8,373,543 B2
(45) Date of Patent: Feb. 12, 2013

(54) RFID TRANSPONDER USING AMBIENT RADIATION

(75) Inventors: Karl D. Brommer, Exeter, NH (US); Candice L. Brittain, Nashua, NH (US); Eldon M. Sutphin, Merrimack, NH (US)

(73) Assignee: BAE Systems Information and Electronic Systems Integrations Inc., Nashua, NH (US)

( * ) Notice: Subject to any disclaimer, the term of this patent is extended or adjusted under 35 U.S.C. 154(b) by 530 days.

(21) Appl. No.: 12/644,561

(22) Filed: Dec. 22, 2009

(65) Prior Publication Data

US 2011/0148580 A1    Jun. 23, 2011

(51) Int. Cl.
*H04Q 5/22* (2006.01)

(52) U.S. Cl. ...................................... 340/10.1
(58) Field of Classification Search ................. 340/10.1, 340/645; 455/86, 127.1, 343.1; 331/131
See application file for complete search history.

(56) References Cited

U.S. PATENT DOCUMENTS

| | | | |
|---|---|---|---|
| 4,746,398 A * | 5/1988 | Motamedi et al. ............ 438/546 |
| 4,870,419 A * | 9/1989 | Baldwin et al. ................ 342/50 |
| 5,652,423 A | 7/1997 | Saitoh et al. | |
| 5,804,811 A | 9/1998 | Saitoh et al. | |
| 6,101,371 A * | 8/2000 | Barber et al. .................. 455/73 |
| 6,798,716 B1 | 9/2004 | Charych | |
| 6,924,164 B2 | 8/2005 | Jenson | |
| 7,081,693 B2 * | 7/2006 | Hamel et al. ................. 307/151 |
| 7,144,655 B2 | 12/2006 | Jenson et al. | |
| 7,157,187 B2 | 1/2007 | Jenson | |
| 7,194,801 B2 | 3/2007 | Jenson et al. | |
| 7,302,858 B2 * | 12/2007 | Walsh et al. ................... 73/780 |
| 7,970,357 B2 * | 6/2011 | Gili et al. ....................... 455/83 |
| 2002/0165758 A1 | 11/2002 | Hind et al. | |
| 2007/0085689 A1 | 4/2007 | Brommer et al. | |
| 2007/0281657 A1 | 12/2007 | Brommer et al. | |
| 2008/0108370 A1 | 5/2008 | Aninye | |

* cited by examiner

*Primary Examiner* — Vernal Brown
(74) *Attorney, Agent, or Firm* — Maine Cernota & Rardin; David A. Rardin (57) ABSTRACT

A tag operates in an environment where transmitted interrogators are not possible or desired. High-efficiency diode rectifiers and low-power oscillators are used in combination with an energy storage element and hysteretic switch. The combination of multi-diode rectifier, low power tunnel diode oscillator, energy storage element and hysteretic switch allow for nanowatt levels of received RF power to be stored to produce micro-watts of RF transmit power. The device trickle charges off of ambient RF radiation until enough energy is stored for transmission.

20 Claims, 12 Drawing Sheets

| Pin (dBm) | Pin (dBm) w/o cable loss; 6dB RL | Pin (dBm) w/o cable loss; 20dB RL | 16 Diode Rectifier Vout (mV) |
|---|---|---|---|
| -50 | -51.8 | -53 | 2 |
| -45 | -46.8 | -48 | 7 |
| -40 | -41.8 | -43 | 15 |
| -35 | -36.8 | -38 | 50 |
| -30 | -31.8 | -33 | 153 |
| -25 | -26.8 | -28 | 423 |
| -20 | -21.8 | -23 | 930 |
| -15 | -16.8 | -18 | 1707 |
| -10 | -11.8 | -13 | 2844 |
| -5 | -6.8 | -8 | 4560 |
| 0 | -1.8 | -3 | 7260 |

Freq = 831MHz

400

16 DIODE RECTIFIER TEST DATA
FIG. 4

16 DIODE RECTIFIER TEST DATA PLOT
FIG. 5

SCHOTTKY DIODE MODEL
FIG. 6

FIG. 7

SINGLE DIODE PAIR (HSMS-286C) INPUT MATCH VS. FREQUENCY @ -30 dBm

SINGLE DIODE PAIR (HSMS-286C) INPUT MATCH
VS. INPUT POWER LEVEL @ 915 MHz

INPUT MATCH
FIG. 8

FIG. 9

ACTIVE HYSTERETIC SWITCH

ACTIVE HYSTERETIC SWITCH TEST DATA

RFID TRANSPONDER USING AMBIENT RADIATION

FIELD OF THE INVENTION

The invention relates to ambient radiation power scavenging, and more particularly, to a transponder using rectifiers and oscillators in combination with an energy storage element and switch.

BACKGROUND OF THE INVENTION

Existing transponder devices such as Radio Frequency IDentification (RFID) tags require either a self-contained power supply, RF energy transmitted from an interrogator, or both to operate. This typically requires close proximity to the interrogator or higher-power RF transmissions. In many environments this is neither feasible nor desirable.

While active RFID tags respond using energy derived from a battery on the tag, this limits tag life to the life of the battery or requires access to the tag to replace batteries as they drain. Tag access is not feasible or possible for many applications. Passive tags not require batteries, but do require RF interrogation signals of sufficient power and duration to enable them to generate the RF response signal. This limits the range over which tags can operate and can cause interference when interrogation signals are at higher powers.

Similarly, sensors that wirelessly communicate their data are limited in range and lifespan. These constraints eliminate applications requiring multiple, inaccessible RF transponder devices.

What is needed, therefore, are techniques for employing ambient radiation to power devices such as sensors and RFID transponders.

SUMMARY OF THE INVENTION

The invention solves the problem of operation of transponders including RFID tags in environments where transmitted interrogators are not possible or desired. This problem is solved using high-efficiency diode rectifiers and low-power oscillators in combination with an energy storage element (optionally with a charging path), and a hysteretic switch.

This combination of the multi-diode rectifier, low-power tunnel diode oscillator, energy storage element and hysteretic switch allow for nanowatt levels of received RF power to be stored to produce micro-watts of RF transmit power. The invention will "trickle" charge off of ambient RF radiation until enough energy is stored for transmission. In nonlimiting embodiments, the transponder can be used as a RFID tag or sensor. Nonlimiting examples of ambient energy sources include television and cell phone transmissions.

Embodiments provide a transponder apparatus operating from ambient radiation comprising a rectifier to at least partially rectify the ambient radiation; an energy storage element storing at least some energy of the rectified ambient radiation, a switch controlling output of at least some energy of the energy storage element, and an oscillator generating a signal for transmission. For other embodiments, the transponder is a Radio Frequency IDentification (RFID) tag; the transponder is a sensor; and the rectifier is a multi-diode rectifier. In some embodiments, the multi-diode rectifier comprises Schottky diodes, and the multi-diode rectifier comprises sixteen diodes. In yet other embodiments, the energy storage element comprises a low current charging path, and the energy storage element further comprises a low current charging path comprising a battery whereby a low duty cycle mode of operation is provided. For yet further embodiments, the switch is a hysteretic switch, the oscillator is a low-power oscillator, and the oscillator comprises a sensor. Other embodiments provide that the sensor is a capacitive sensor, and that the sensor is a Micro-Electro-Mechanical Systems (MEMS) capacitive sensor. For another embodiment, the oscillator comprises an inductor, a Micro-Electro-Mechanical Systems (MEMS) sensor, and a tunnel diode.

Additional embodiments provide a method for transponding using ambient radiation comprising receiving the ambient radiation, rectifying energy from the ambient radiation, storing the rectified energy from the received ambient radiation, switching power of the stored rectified energy, modulating the power, and transmitting the modulated power. More embodiments provide that the step of rectifying comprises full wave rectification, the step of switching comprises hysteretic switching, the step of modulating comprises a low power oscillator, and the step of oscillating comprises sensing a capacitance.

Yet an additional embodiment provides a Radio Frequency IDentification (RFID) tag sensor system operating from ambient radiation comprising a rectifier to at least partially rectify the ambient radiation, wherein the rectifier comprises sixteen Schottky diodes, an energy storage element storing at least some energy of the rectified ambient radiation, wherein the energy storage element comprises a low current charging path comprising a battery whereby a low duty cycle mode of operation is provided, a switch controlling output of at least some energy of the energy storage element, wherein the switch is an active hysteretic switch, and an oscillator generating a signal for transmission, wherein the oscillator comprises an inductor, a Micro-Electro-Mechanical Systems (MEMS) capacitive sensor, and a tunnel diode.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
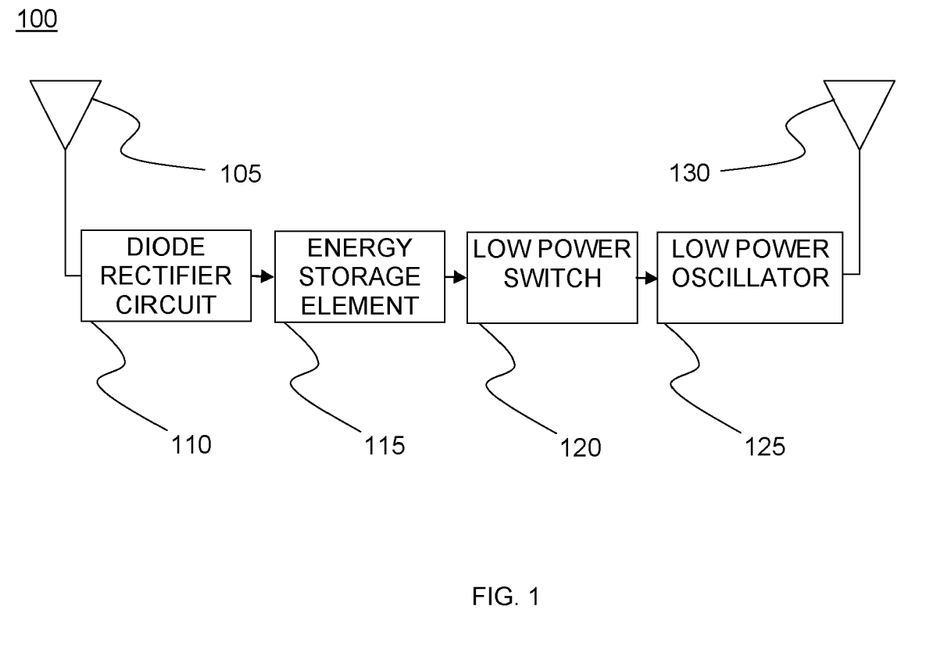
FIG. 1 is a block diagram illustrating a transponder that operates off of ambient radiation configured in accordance with one embodiment of the present invention.

FIG. 1 illustrates embodiment 100 of an RFID transponder that operates off of ambient radiation. The antenna 105 receives RF power from the environment. The diode rectifier 110 is a high efficiency diode rectifier circuit that converts nano-watt levels of received RF power to milli-volt levels of DC voltage. The DC power is stored in the energy storage element 115. Once the energy storage element 115 is charged to a pre-defined level, the hysteretic switch 120 will discharge the energy to the low power oscillator 125. Low power oscillator 125 operates off of low voltage levels to produce microwatts of transmit power. The microwatts of power generated from nano-watt levels of received RF energy is transmitted via antenna 130. An optional low current (nanoamps) charging path and small battery may be added to the energy storage element 115, allowing for a low duty cycle mode of operation. Battery power consumption is sufficiently low that the battery will last for essentially its shelf life. In embodiments, an optional capacitive sensor may be added to the low power oscillator 125 allowing for real-time change detection to take place. The capacitive sensor will shift its value of capacitance based on a sensed change in the environment in which the device is placed. This shift in capacitance will cause the transmitted signal to shift in frequency. A detected shift in transmit frequency can signify the user that a change has occurred.

Figure 2:
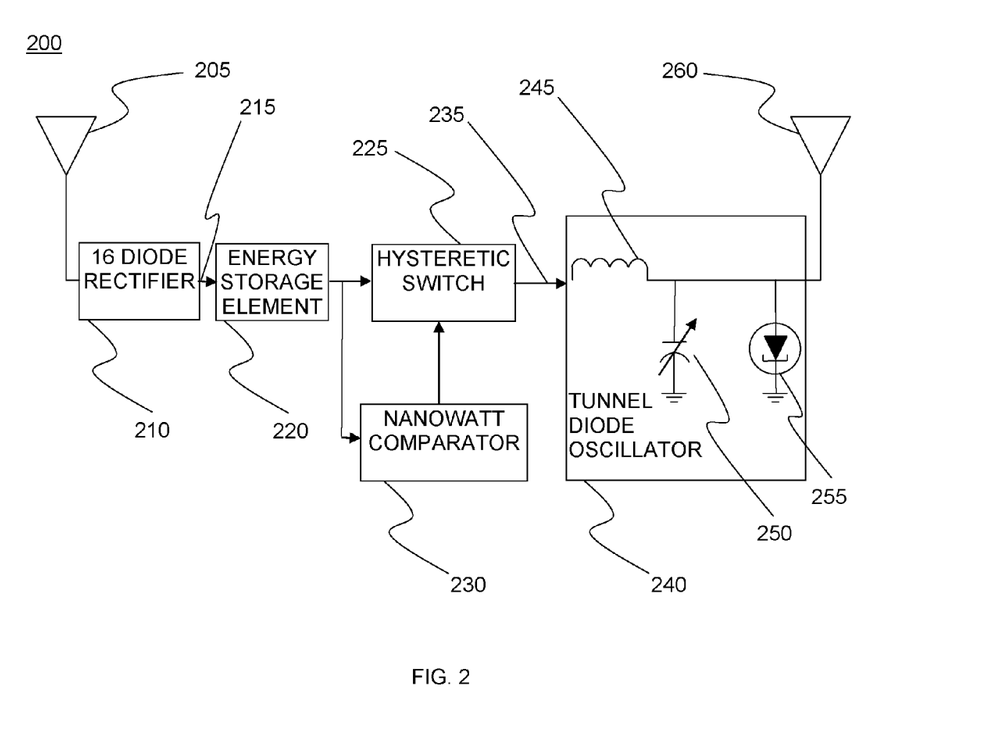
FIG. 2 is a block diagram of a transponder that operates off of ambient radiation comprising a hysteretic switch configured in accordance with one embodiment of the present invention.

FIG. 2 depicts embodiment 200 with receive antenna 205 operating at 831 MHz −28 to −38 dBm. For nonlimiting embodiments, 160 to 1600 nW activate the tag. Sixteen diode rectifier 210 has output 215 of 50 to 400 millivolts to energy storage element 220. Energy storage element 220 comprises 1 to 10 microFarad capacitance (1.3 nJ to 80 nJ of stored energy), with $E = \frac{1}{2}(CV^2)$, taking 160 to 1,600 mS to charge and 40 to 800 mS to discharge. Energy storage element 220 output is provided to hysteretic switch 225 and nanowatt comparator 230. Nonlimiting embodiment examples include a Maxim® MAX9027 at 1.8 volts at 450 nA. Maxim is a registered trademark of Maxim Integrated Products, Inc. Output of switch 225 is 235 50 to 200 millivolts. Switch 225 output 235 is applied to tunnel diode oscillator 240. Tunnel diode oscillator 240 operates at 50 to 200 micro watts (65 millivolts at 1 milliamp, typical) and comprises inductor 245, Micro-Electro-Mechanical Systems (MEMS) sensor 250, and tunnel diode 255. For embodiments, output to transmit antenna 260 is −26 dBm typical at 2 GHz. The LC tank circuit determines the transmit frequency. A nonlimiting embodiment example is a transmission of 50 microwatts every 5 mS or 200 microwatts every 20 mS (for a 10 nJ pulse).

Voltage Rectification

A two diode voltage doubler (a full wave rectifier) increases the voltage sensitivity of a Schottky diode detector when compared to a single diode detector circuit. The output voltage is essentially doubled. The shunt diode provides a DC offset equal to the peak voltage and the series diode acts as the detector. The Detector Input=Input Sine Wave+DC voltage. The Detector Output=Input Sine Wave Voltage, peak-to-peak (double that of a single diode detector). The diode impedance is added in parallel, resulting in a higher capacitive load and a lower series resistance. Embodiments include a sixteen diode rectifier.

Figure 3:
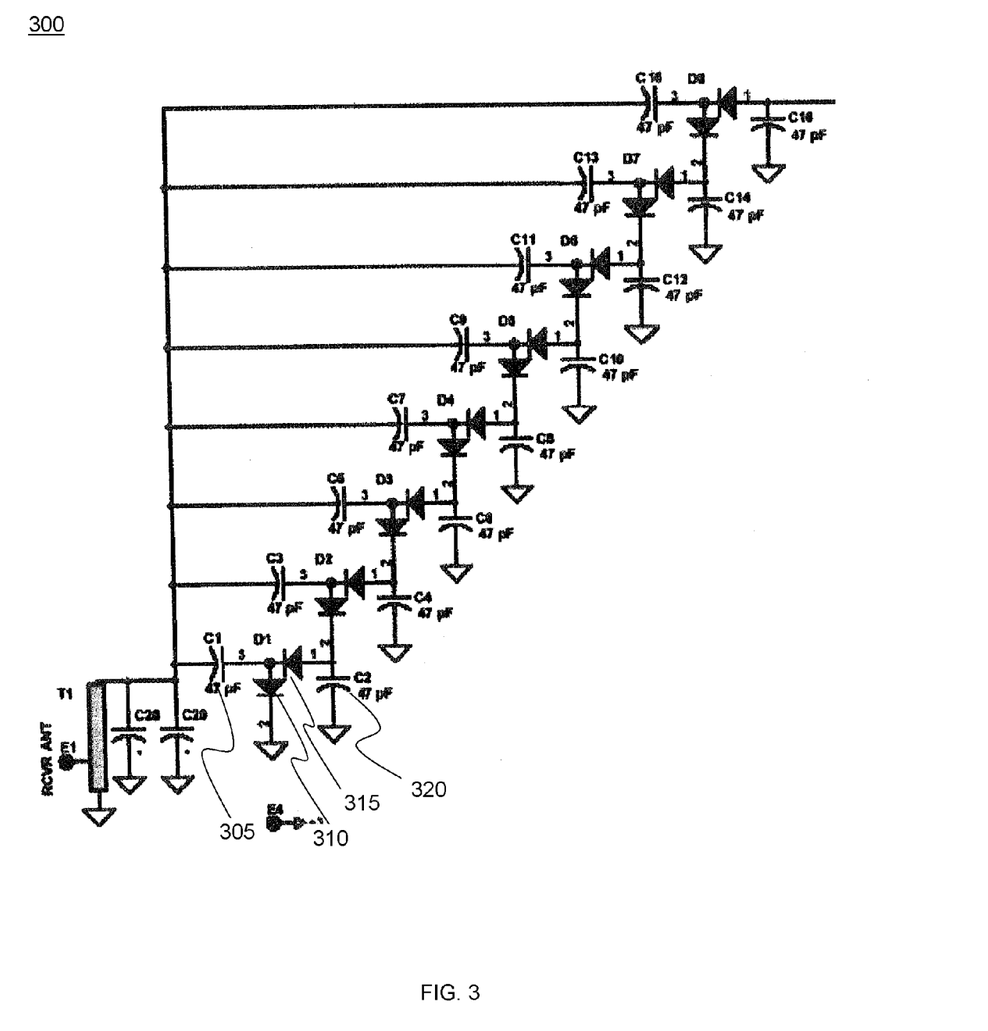
FIG. 3 is a schematic of a sixteen diode rectifier configured in accordance with one embodiment of the present invention.

FIG. 3 is a schematic of a sixteen diode rectifier 300 incorporated in embodiments. Sub-components comprise a first capacitor 305, a first diode 310, a second diode 315, and a second capacitor 320 forming branches of the rectifier.

Figure 4:
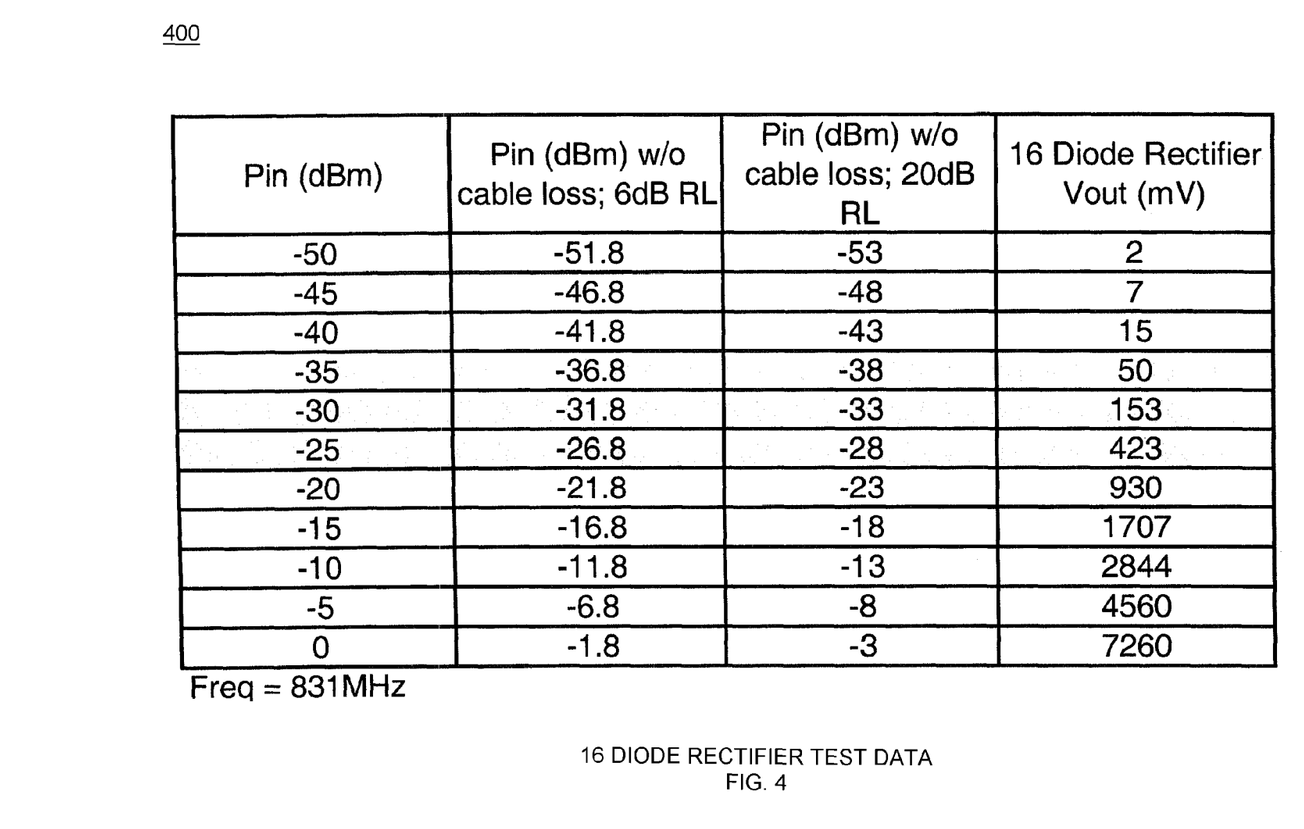
FIG. 4 presents rectifier test data for a sixteen diode rectifier configured in accordance with one embodiment of the present invention.

FIG. 4 presents rectifier test data 400 for a sixteen diode rectifier. Frequency is 831 MHz and data presented includes power in (Pin) in dBm, and the voltage out (Vout) in millivolts. For Pin from −50 to 0 dBm, Vout was 2 to 7,260 millivolts, respectively.

Figure 5:
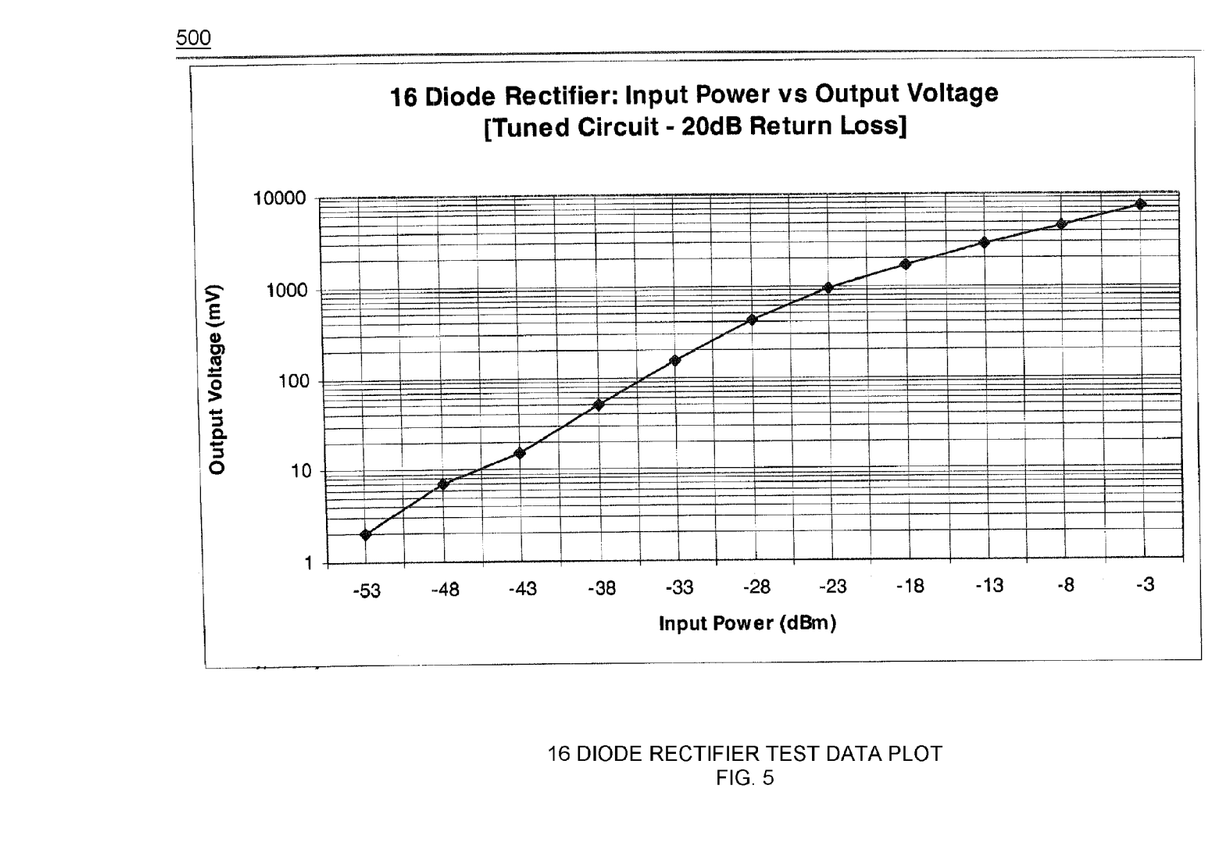
FIG. 5 is a graph showing the resultant curve representing the data of FIG. 4 of input power versus output voltage configured in accordance with one embodiment of the present invention.

FIG. 5 is a graph 500 showing the resultant curve represented by the data of FIG. 4 of input power versus output voltage. This is for a tuned circuit −20 dB return loss.

Figure 6:
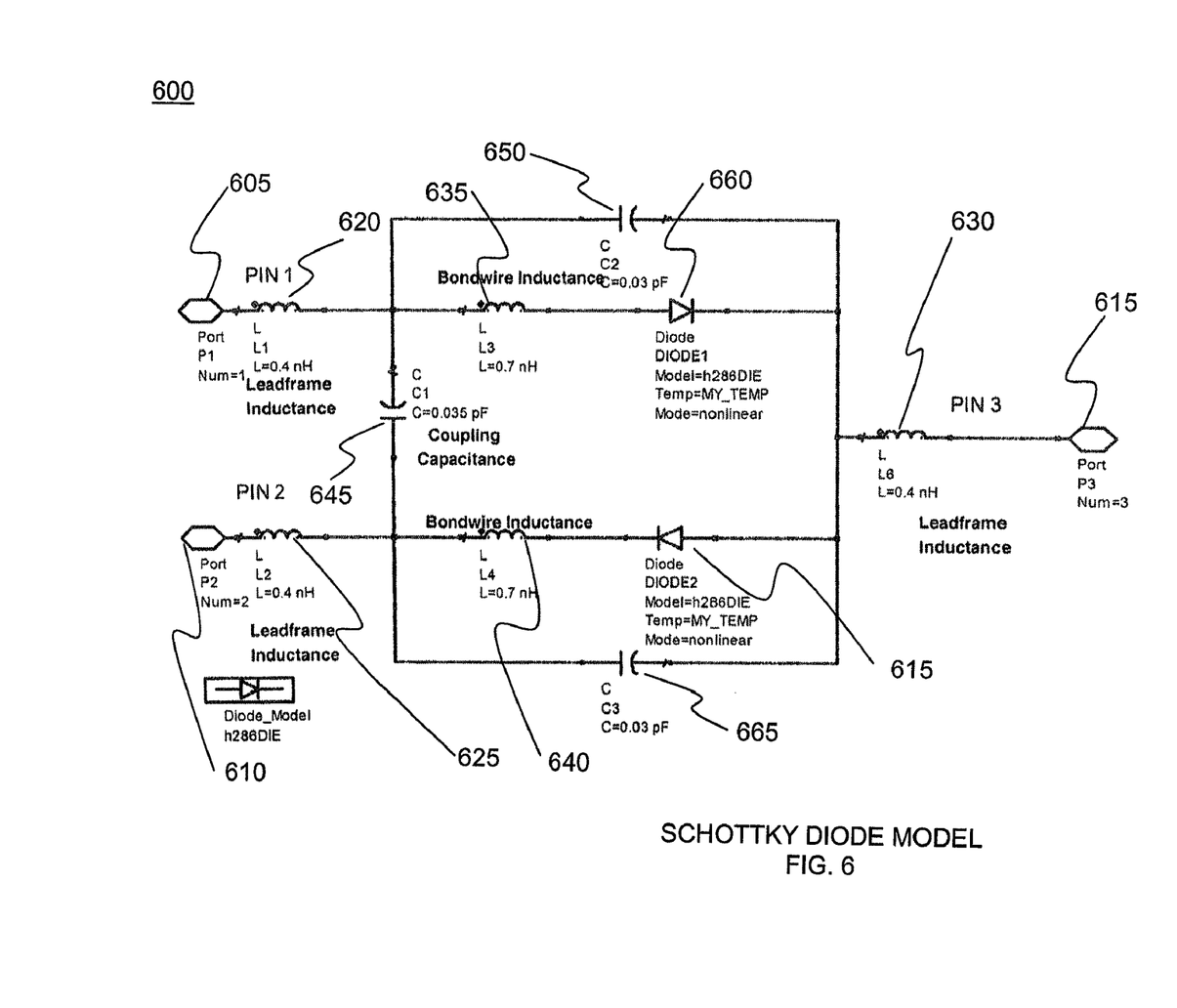
FIG. 6 depicts a Schottky diode configuration in accordance with one embodiment of the present invention.

FIG. 6 depicts a Schottky diode configuration 600 for modeling. Considerations include package capacitance, leadframe inductance, and bondwire inductance. Modeling components include ports, inductances, capacitances and diodes. Ports include Port 1 605, Port 2 610 and Port 3 615. Inductance components include leadframe inductances L1 0.4 nH 620, L2 0.4 nH 625 and L6 0.4 nH 630, and bondwire inductances L3 0.7 nH 635 and L4 0.7 nH 640. Capacitances include coupling capacitance C1 0.035 pF 645, C2 0.03 pF 650, and C3 0.03 pF 655. Diodes include diode D1 660 and diode D2 665.

Figure 7:
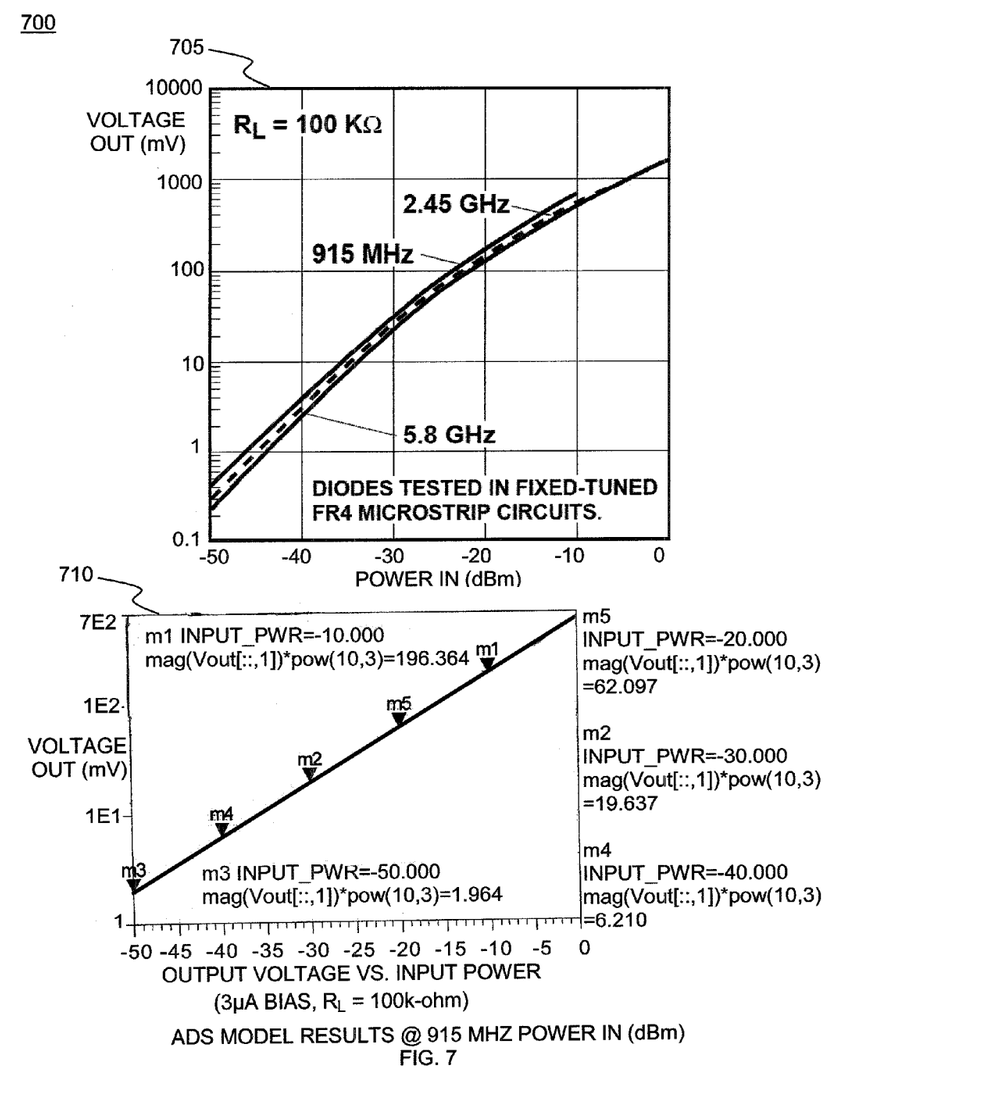
FIG. 7 shows graphs of performance depicting voltage out for power in configured in accordance with one embodiment of the present invention.

FIG. 7 shows graphs of performance 700 depicting voltage out (mV) for power in (dBm). Datasheet values 705 compare with model results 710. Modeling results are for 915 MHz. These conditions included a 3 microamp bias and an RL=100 k ohms.

Figure 8:
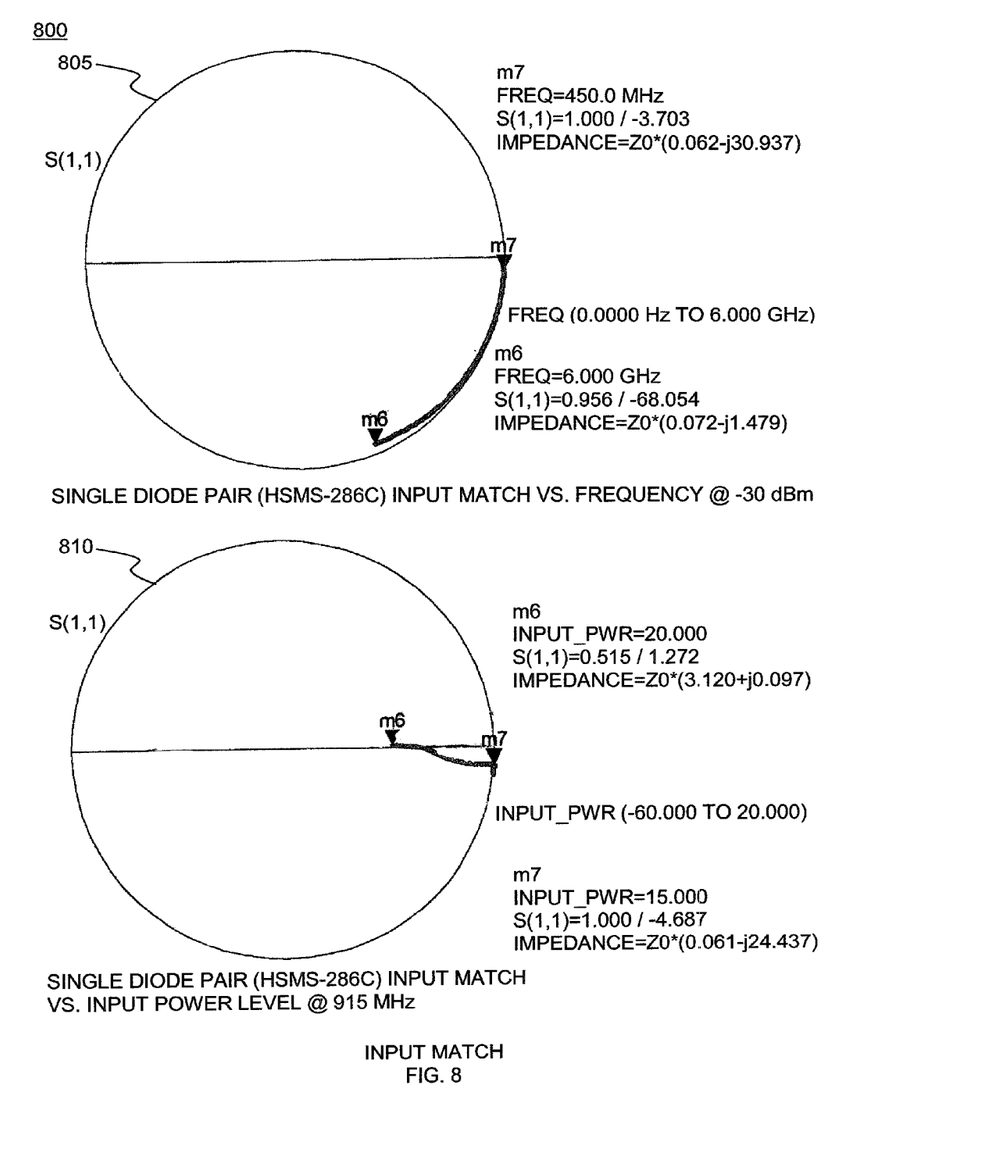
FIG. 8 provides input match (S11) for ports 2 and 3 configured in accordance with one embodiment of the present invention.

FIG. 8 provides input match (S11) 800 where ports 2 and 3 of the model of FIG. 6 are terminated in 47 pF capacitors. Shown are single diode pair input match versus frequency at −30 dBm 805 for m7 at 450 MHz, with S(1,1)=1.0000/−3.703 and impedance of Z0*(0.062−j30.937) and m6 at 6.000 GHz with S(1,1)=0.956/−68.054 and impedance of Z0*(0.072−j1.479) and single diode pair input match versus power level at 915 MHz 810 for m6 with input power=20.000, S(1,1)=0.515/1.272 and impedance of Z0*(3.120−j0.097) and m7 with input power=15.000, S(1,1)=1.000/−4.687 and impedance of Z0*(0.061−j24.437). An ADS HSMS-286C is representative but not limiting.

Figure 9:
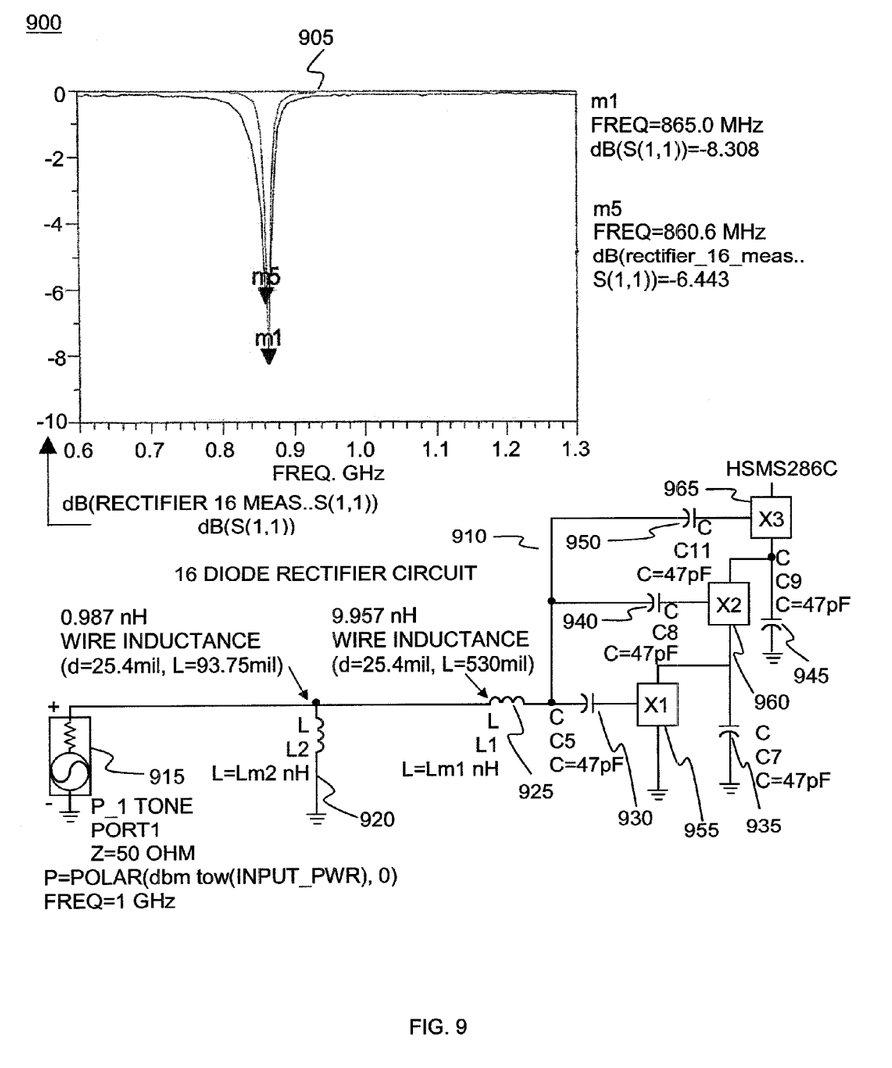
FIG. 9 presents data and a circuit model for a sixteen diode rectifier configured in accordance with one embodiment of the present invention.

FIG. 9 includes data and circuit model 900 for a sixteen diode rectifier. Data graph 905 depicts point m1 at a frequency of 865.0 MHz, dB(S(1,1))=8.308 and point m5 at 860.6 MHz, dB(S(1,1))=6.443. Circuit 910 includes Port 1 with Z=50 ohms 915, wire inductance L2 of 0.987 nH 920, wire inductance L1 of 9.957 nH 925. Capacitances include C5 of 47 pF 930, C7 of 47 pF 935, C8 of 47 pF 940, C9 of 47 pF 945, and C11 of 47 pF 950. Schottky diode models include X1 955, X2 960, and X3 965.

Hysteretic Switch

Figure 10:
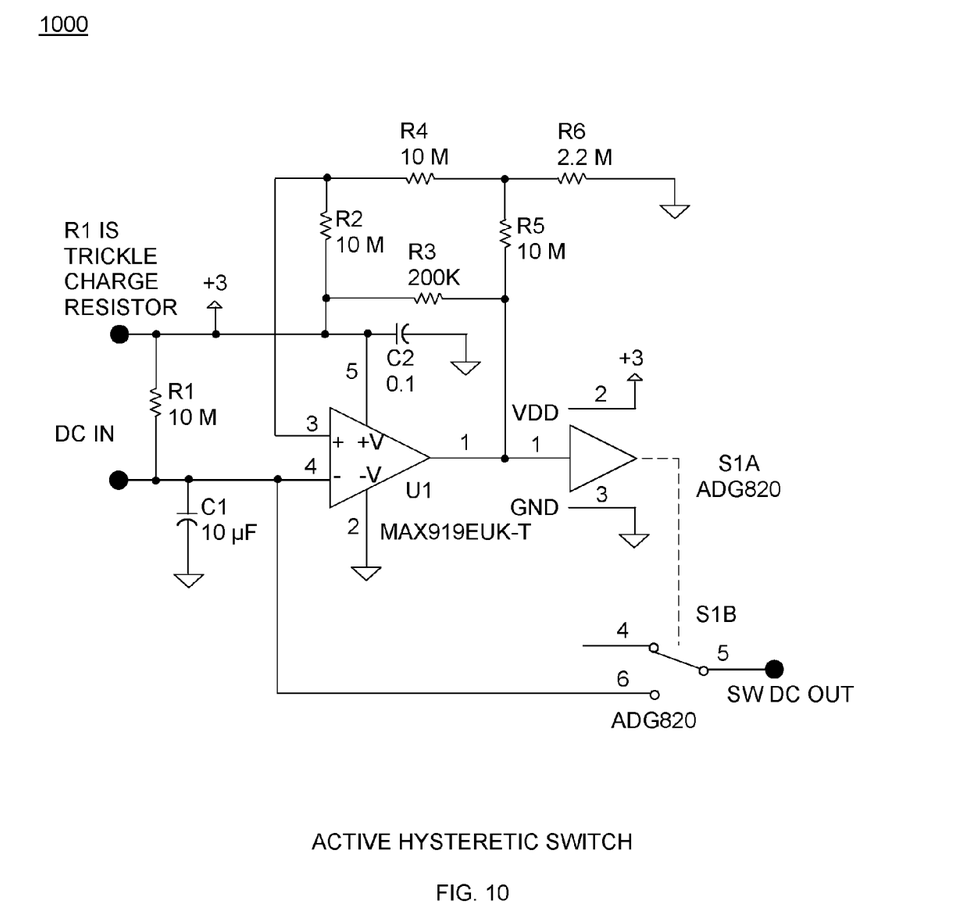
FIG. 10 is a schematic diagram of a hysteretic switch configured in accordance with one embodiment of the present invention.

FIG. 10 is a schematic diagram 1000 of a hysteretic switch included in embodiments of the invention. Active switch 1000 comprises resistor R1 of 10M, R2 of 10M, R3 of 200 k, R4 of 10M, R5 of 10M, R6 of 2.2M, where R1 serves as a trickle charge resister. Capacitors include C1 of 10 µF and C2 of 0.1 µF. Also included are nanopower comparator U1, which, in nonlimiting embodiments, is a MAX919EUK-T;

and single pole, double throw (SPDT) switches S1B and S2B which, in nonlimiting embodiments, are ADG820 designation switches.

Figure 11:
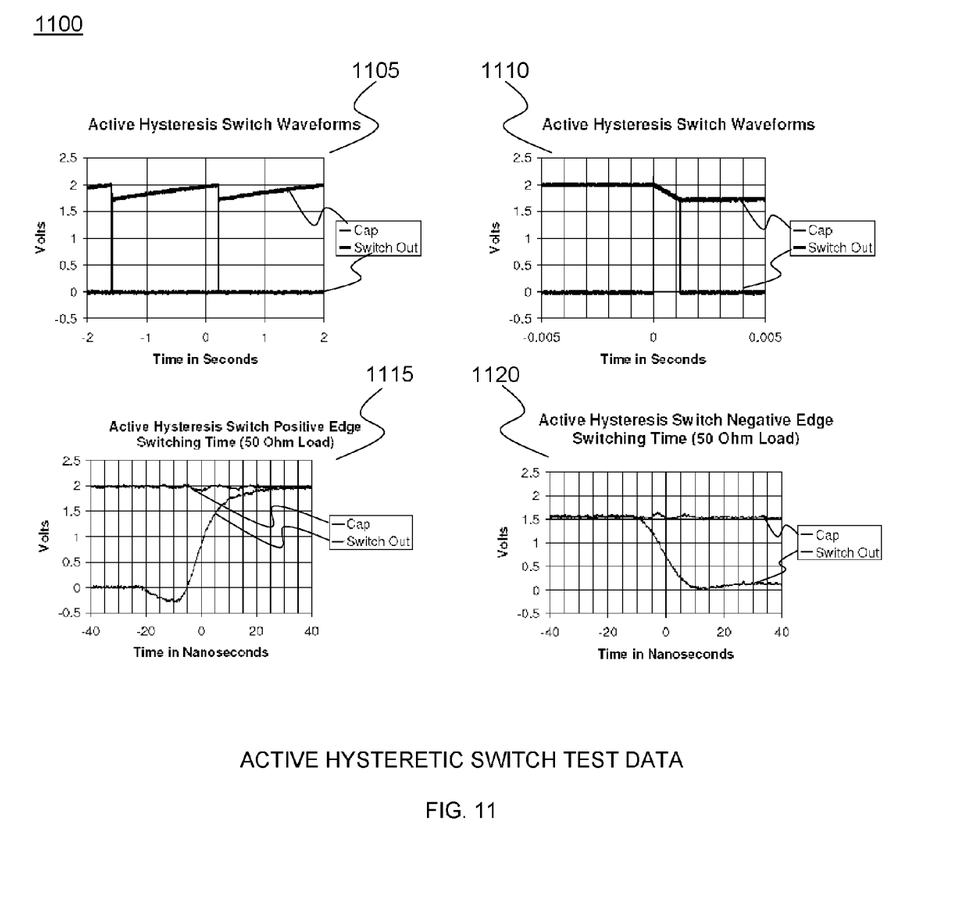
FIG. 11 provides data for a hysteretic switch configured in accordance with one embodiment of the present invention.

FIG. 11 provides data for an embodiment 1100 of a hysteretic switch. Active hysteresis switch waveform 1105 provides Cap and Switch out results for −2 to +2 seconds over −0.5 to +2.5 volts. Active hysteresis switch waveform 1110 provides Cap and Switch out results for −0.005 to +0.005 seconds over −0.5 to +2.5 volts. Active hysteresis switch positive edge switching time (50 Ohm load) 1115 provides Cap and Switch out results for −40 to +40 nanoseconds over −0.5 to +2.5 volts. Active hysteresis switch negative edge switching time (50 Ohm load) 1120 provides Cap and Switch out results for −40 to +40 nanoseconds over −0.5 to +2.5 volts. In embodiments, the hysteretic switch trickle charges batteries and or capacitors. Properties are derived from the input voltage level. Employing a hysteretic switch plus low-power components enables use of very small devices.

Method

Figure 12:
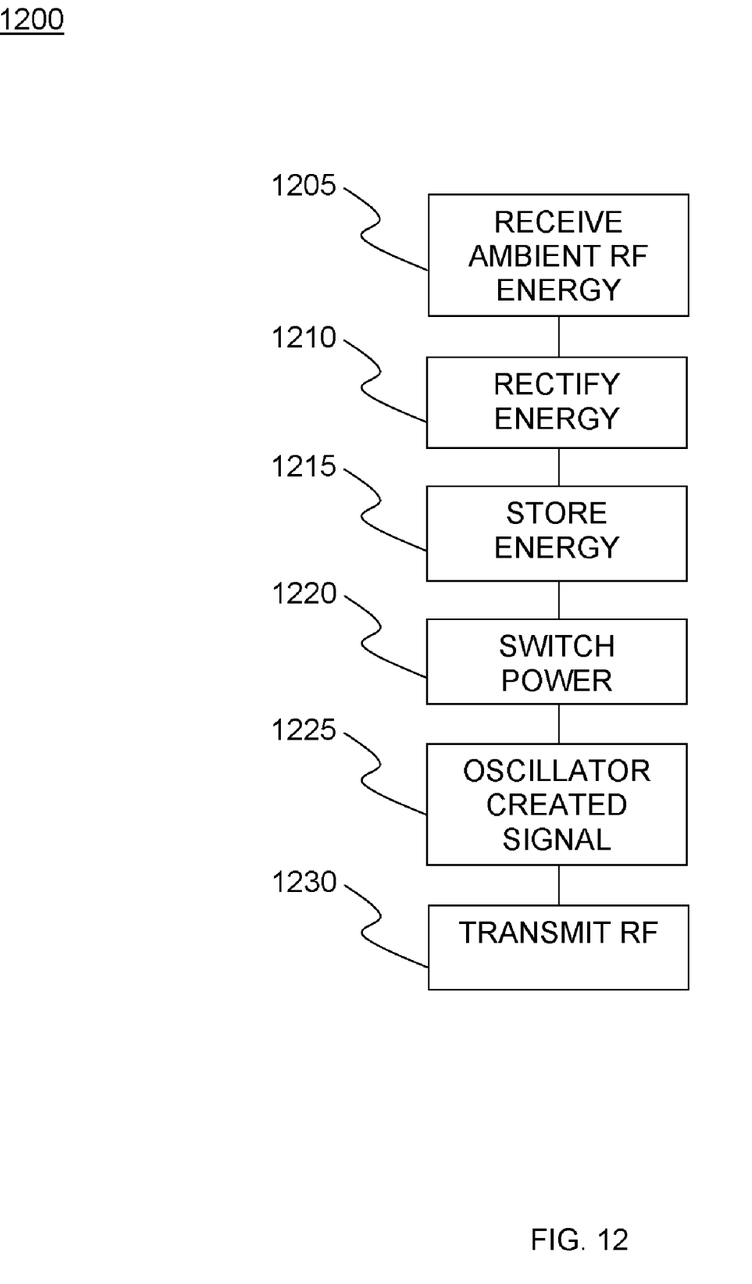
FIG. 12 is a flow chart depicting a method for a transponder using ambient radiation configured in accordance with one embodiment of the present invention.

FIG. 12 is a flow chart depicting a method 1200 for a transponder using ambient radiation. Ambient radiation is received 1205, the energy from the ambient radiation is rectified 1210, energy is stored 1215, power is switched 1220, power is modulated by an oscillator 1225, and a signal is transmitted 1230.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A transponder apparatus operating from ambient radiation comprising:
   a rectifier to at least partially rectify said ambient radiation, said rectifier comprising a network of a plurality of shunt diodes and a plurality of series diodes;
   an energy storage element storing at least some energy of said rectified ambient radiation;
   a switch controlling output of at least some energy of said energy storage element; and
   an oscillator generating a signal for transmission.

2. The apparatus of claim 1 wherein said transponder is a Radio Frequency IDentification (RFID) tag.

3. The apparatus of claim 1 wherein said transponder is a sensor.

4. The apparatus of claim 1 wherein said rectifier is a branched multi-diode rectifier.

5. The apparatus of claim 4 wherein said multi-diode rectifier comprises Schottky diodes.

6. The apparatus of claim 4 wherein said multi-diode rectifier comprises sixteen diodes.

7. The apparatus of claim 1 wherein said energy storage element comprises a low current charging path.

8. The system of claim 1 wherein said energy storage element further comprises a low current charging path comprising a battery whereby a low duty cycle mode of operation is provided.

9. The apparatus of claim 1 wherein said switch is a hysteretic switch.

10. The apparatus of claim 1 wherein said oscillator is a low-power oscillator.

11. The apparatus of claim 1 wherein said oscillator comprises a sensor.

12. The apparatus of claim 11 wherein said sensor is a capacitive sensor.

13. The apparatus of claim 12 wherein said sensor is a Micro-Electro-Mechanical Systems (MEMS) capacitive sensor.

14. The apparatus of claim 1 wherein said oscillator comprises an inductor, a Micro-Electro-Mechanical Systems (MEMS) sensor, and a tunnel diode.

15. A method for transponding using ambient radiation comprising:
   receiving said ambient radiation;
   rectifying energy from said ambient radiation, said rectifying comprising rectification by a network of a plurality of shunt diodes and a plurality of series diodes;
   storing said rectified energy from said received ambient radiation;
   switching power of said stored rectified energy;
   modulating said power; and
   transmitting said modulated power.

16. The method of claim 15 wherein said step of rectifying comprises full wave rectification.

17. The method of claim 15 wherein said step of switching comprises hysteretic switching.

18. The method of claim 15 wherein said step of modulating comprises a low power oscillator.

19. The method of claim 15 wherein said step of oscillating comprises sensing a capacitance.

20. A Radio Frequency IDentification (RFID) tag sensor system operating from ambient radiation comprising:
   a rectifier to at least partially rectify said ambient radiation, wherein said rectifier comprises a network of a plurality of shunt diodes and a plurality of series diodes comprising sixteen Schottky diodes;
   an energy storage element storing at least some energy of said rectified ambient radiation, wherein said energy storage element comprises a low current charging path comprising a battery whereby a low duty cycle mode of operation is provided;
   a switch controlling output of at least some energy of said energy storage element, wherein said switch is an active hysteretic switch; and
   an oscillator generating a signal for transmission, wherein said oscillator comprises an inductor, a Micro-Electro-Mechanical Systems (MEMS) capacitive sensor, and a tunnel diode.

* * * * *